United States Patent
Furuumi et al.

(10) Patent No.: US 7,210,011 B2
(45) Date of Patent: Apr. 24, 2007

(54) INFORMATION PROCESSING SYSTEM, STORAGE SYSTEM, STORAGE DEVICE CONTROLLER AND PROGRAM THAT ENABLE FACILITATING THE RECOVERY WORK OF REMOTE COPYING

(75) Inventors: Noboru Furuumi, Tokyo (JP); Yoshihiro Asaka, Odawara (JP); Junichi Muto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 339 days.

(21) Appl. No.: 10/722,781

(22) Filed: Nov. 25, 2003

(65) Prior Publication Data

US 2004/0172511 A1    Sep. 2, 2004

(30) Foreign Application Priority Data

Nov. 27, 2002    (JP)    ............................. 2002-343436

(51) Int. Cl.
    *G06F 12/16*    (2006.01)
(52) U.S. Cl. ............................. 711/162; 714/6; 709/239
(58) Field of Classification Search ...................... None
    See application file for complete search history.

(56) References Cited

U.S. PATENT DOCUMENTS

| | | | |
|---|---|---|---|
| 3,795,901 A | | 3/1974 | Boehm et al. |
| 5,051,887 A | | 9/1991 | Berger et al. |
| 5,420,988 A | * | 5/1995 | Elliott ......................... 712/300 |
| 5,544,347 A | | 8/1996 | Yanai et al. |
| 5,649,152 A | | 7/1997 | Ohran et al. |
| 5,742,792 A | | 4/1998 | Yanai et al. |
| 5,832,510 A | | 11/1998 | Ito et al. |
| 5,845,295 A | | 12/1998 | Houseman et al. |
| 5,889,935 A | | 3/1999 | Ofek et al. |
| 5,901,327 A | | 5/1999 | Ofek |
| 5,960,216 A | | 9/1999 | Vishlitzky et al. |
| 5,987,521 A | * | 11/1999 | Arrowood et al. .......... 709/239 |
| 6,000,020 A | | 12/1999 | Chin et al. |
| 6,173,377 B1 | * | 1/2001 | Yanai et al. ................. 711/162 |
| 6,219,753 B1 | | 4/2001 | Richardson |

(Continued)

FOREIGN PATENT DOCUMENTS

JP        04-311218        11/1992

(Continued)

*Primary Examiner*—Hyung Sough
*Assistant Examiner*—Kaushik Patel
(74) *Attorney, Agent, or Firm*—Townsend and Townsend and Crew LLP

(57) ABSTRACT

Disclosed is an information processing system including a first information processing apparatus having a first communication port for transmitting and receiving data; a second information processing apparatus having a second communication port for transmitting and receiving data; and a communicating portion for executing bi-directional communication between the first communication port and the second communication port, the information processing system comprising a utilizing portion for utilizing the communicating portion, for communication in a direction for which a first application program run on the first information processing apparatus sets the first communication port and the second communication port respectively as the sender and the destination of data; and a utilizing portion for utilizing the communicating portion, for communication in a direction for which a second application program run on the second information processing apparatus sets the second communication port and the first communication port respectively as the sender and the destination of data.

16 Claims, 8 Drawing Sheets

U.S. PATENT DOCUMENTS

| | | |
|---|---|---|
| 6,304,980 B1 | 10/2001 | Beardsley et al. |
| 6,658,434 B1 | 12/2003 | Watanabe et al. |
| 6,658,540 B1 | 12/2003 | Sicola et al. |
| 6,665,812 B1 | 12/2003 | Blumenau et al. |
| 6,681,303 B1 | 1/2004 | Watanabe et al. |
| 6,697,960 B1 | 2/2004 | Clark et al. |
| 6,912,629 B1 * | 6/2005 | West et al. ............ 711/161 |
| 6,947,981 B2 * | 9/2005 | Lubbers et al. ........ 709/223 |
| 2003/0014433 A1 * | 1/2003 | Teloh et al. ............ 707/204 |
| 2003/0033463 A1 | 2/2003 | Garnett et al. |
| 2003/0041207 A1 | 2/2003 | Kamakura et al. |
| 2003/0182526 A1 | 9/2003 | Mikkelsen et al. |
| 2004/0107246 A1 | 6/2004 | Akashika et al. |
| 2004/0107325 A1 | 6/2004 | Mori |
| 2004/0153471 A1 | 8/2004 | Saika et al. |
| 2004/0172510 A1 | 9/2004 | Nagashima et al. |
| 2004/0193658 A1 | 9/2004 | Kawamura et al. |

FOREIGN PATENT DOCUMENTS

| | | |
|---|---|---|
| JP | 04-311219 | 11/1992 |
| JP | 05-081147 | 4/1993 |
| JP | 05-120110 | 5/1993 |
| JP | 03-004223 | 1/1994 |
| JP | 06-139027 | 5/1994 |
| JP | 06-168080 | 6/1994 |
| JP | 06-236340 | 8/1994 |
| JP | 06-290002 | 10/1994 |
| JP | 06-309209 | 11/1994 |
| JP | 07-093101 | 4/1995 |
| JP | 07-200191 | 8/1995 |
| JP | 07-239759 | 9/1995 |
| JP | 08-212142 | 8/1996 |
| JP | 08-234916 | 9/1996 |
| JP | 09-050394 | 2/1997 |
| JP | 09-101912 | 4/1997 |
| JP | 10-283121 | 10/1998 |
| JP | 11-272427 | 10/1999 |
| JP | 2001-306414 | 11/2001 |

* cited by examiner

INFORMATION PROCESSING SYSTEM, STORAGE SYSTEM, STORAGE DEVICE CONTROLLER AND PROGRAM THAT ENABLE FACILITATING THE RECOVERY WORK OF REMOTE COPYING

CROSS-REFERENCE TO RELATED APPLICATIONS

This application claims priority to Japanese Patent Application No. 2002-343436 filed on Nov. 27, 2002, the content of which is incorporated herein by reference.

BACKGROUND OF THE INVENTION

1. Field of the Invention

The present invention relates to an information processing system, a storage system, a storage device controller and a program.

2. Description of the Related Arts

Recently, a technique called remote copying has been developed in order to prevent losing of data stored in a computer system and to enable an immediate recovery of the system even when a disaster such as a great earthquake occurs. The remote copying is a technique with which a duplicate of data is stored in a storage apparatus of a back-up computer system placed on a remote site (see, e.g., Japanese Patent Application Laid-open (Kokai) Pub. No. 2001-306414).

Thereby, it is possible to carry out tasks using a computer system on the remote site even if the operation of the computer system on the main site is terminated when a disaster occurs.

To realize the remote copying described above, it is necessary to set up a data communication path between the main site and the remote site. In a conventional remote copying, when the two storage apparatuses respectively try to set up a data communication path such that each storage apparatus is the sender of data respectively, it is impossible to form the data communication path of each storage apparatus on a one same communication path physically.

Furthermore, when the computer system on the main site has been recovered, it is necessary to update the data on the main site by duplicating the data updated on the remote site after a failure has occurred on the main site. Therefore, settings need to be made such that the data is transmitted in the direction from the remote site to the main site but much time and labor are necessary to make such settings.

SUMMARY OF THE INVENTION

The present invention was conceived based on the above and other viewpoints. One object of the invention is to provide an information processing system, a storage system, a storage device controller and a program that utilize effectively a communication path for carrying out remote copying and enable facilitating the recovery work of the remote copying.

In order to achieve the above object, the present invention provides an information processing system including a first information processing apparatus having a first communication port for transmitting and receiving data; a second information processing apparatus having a second communication port for transmitting and receiving data; and a communicating portion for executing bi-directional communication between the first communication port and the second communication port, the information processing system comprising a utilizing portion for utilizing the communicating portion, for communication in a direction for which a first application program run on the first information processing apparatus sets the first communication port and the second communication port respectively as the sender and the destination of data; and a utilizing portion for utilizing the communicating portion, for communication in a direction for which a second application program run on the second information processing apparatus sets the second communication port and the first communication port respectively as the sender and the destination of data.

The other features and objects than the above will become more apparent when reading the descriptions of this specification with reference to the accompanying drawings.

BRIEF DESCRIPTION OF THE DRAWINGS

For the full understanding of the present invention and advantages thereof, the following description should be referred to in conjunction with the accompanying drawings in which.

DETAILED DESCRIPTION OF THE INVENTION

Example of Overall Configuration

An embodiment of the invention will now be described in greater detail with reference to the drawings.

Figure 1:
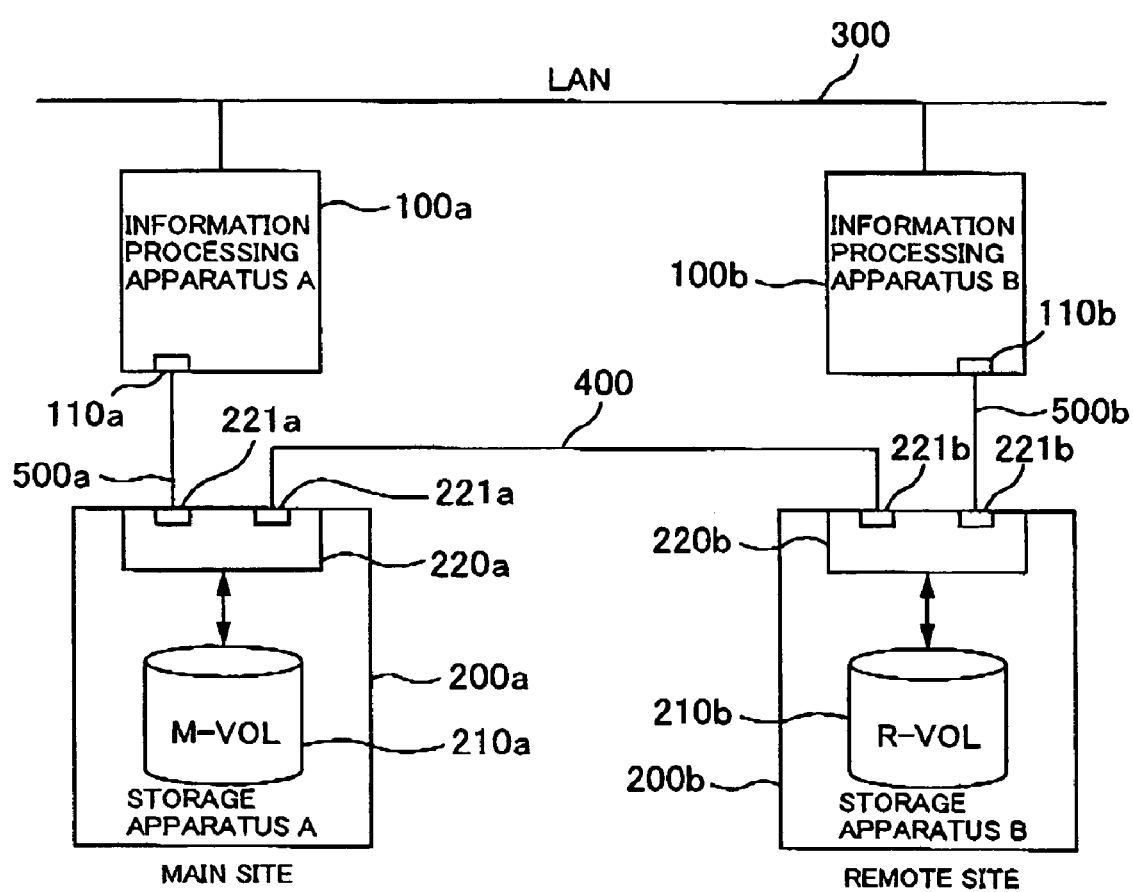
FIG. 1 is a block diagram showing the entire configuration of a storage device controller system according to an embodiment.

Referring first to FIG. 1, a block diagram is shown which illustrates the entire configuration of a storage device controller system according to an embodiment.

An information processing apparatus A 100*a* is a computer comprising a CPU (Central Processing Unit), a memory etc. It receives an order from an operation terminal (not shown) connected with an LAN 300 and executes a predetermined program. This apparatus can be used as, for example, a core computer in a large-scale computer system such as an ATM system of a bank and a seat reservation system for ticketing of airlines.

An information processing apparatus B 100*b* is also a computer comprising a CPU, a memory etc. It is the computer that operates in place of the information processing apparatus A 100*a* when the information processing apparatus A 100*a* is disabled from operating by occurrence of a disaster etc. The information processing apparatus B 100*b* is placed on a remote site far from the information processing apparatus A 100*a* and is connected with the information processing apparatus A 100*a* through the LAN 300.

The information processing apparatus A 100*a* is connected with a storage apparatus A 200*a* through a data input/output link A 500*a*. The storage apparatus A 200*a* comprises an input/output control unit A 220*a* (a storage device controller) and a storage volume A (a storage device, M-VOL (Master Volume)) 210*a* and stores data interchanged between the storage apparatus A 200*a* and the information processing apparatus A 100*a*.

The input/output control unit A 220*a* comprises a CPU, a memory etc. and controls input/output of data sent and received between the information processing apparatus A 100*a* and the storage volume A 210*a*. Input/output of data between the information processing apparatus A 100*a* is carried out through a data input/output link A 500*a* connected with a communication port A 221*a*.

The input/output control unit A 220*a* is also provided with another communication port A 221*a* which is connected with a remote copying link 400. The remote copying link 400 is a data transferring path connecting physically the storage apparatus A 200*a* and a storage apparatus B 200*b*.

In such a computer system, remote copying is carried out in the following procedure. That is, the ordinary task is executed on the main site provided with the information processing apparatus A 100*a* and the storage apparatus A 200*a*. For writing data from the information processing apparatus A 100*a* to the storage apparatus A 200*a*, the input/output control unit A 220*a* transmits a duplicate of the data through the remote copying link 400 to an input/output control unit B 220*b* provided to the storage apparatus B 200*b*. Then, the input/output control unit B 220*b* writes the data to a storage volume B (R-VOL (Remote Volume)) 210*b*.

In this way, remote copying causes both of the storage apparatus A 200*a* and the storage apparatus B 200*b* to have same data. It is possible to adapt such that the data is doubly written in the storage apparatus A 200*a* and the storage apparatus B 200*b*. Furthermore, it is also possible to adapt such that a duplicate of data to be written to the storage apparatus A 200*a* is written to the storage apparatus B 200*b*. Yet furthermore, data having been written in the storage apparatus A 200*a* is duplicated in the storage apparatus B 200*b*. By carrying out remote copying, it is possible to execute tasks on the remote site even when execution of the tasks is impossible on the main site in case of a disaster.

Surely, it is also possible to remote-copy mutually on both of the main site and remote site. Adapting in this way, in case a disaster occurs to the system on one of the sites, tasks can be executed on the other site while the main site and the remote site respectively execute their individual tasks in their normal operation, It is possible to adapt such that the computer system on the remote site continues executing tasks as has been and the execution of tasks is returned to the system on the main site when the computer system on the main site has been recovered.

In the former case, it is necessary to make settings for changing the direction in which duplicates of data is transmitted such that the site having been the remote site becomes a main site and the site having been the main site functions as a remote site.

In the latter case, it is necessary to update the data on the main site by duplicating the data updated on the remote site after the occurrence of the failure on the main site. Therefore, it is necessary to make settings such that the data is transmitted in a direction from the remote site to the main site.

In this way, it is necessary to make settings in advance as to where the data is transmitted from and to when carrying out remote copying. The contents of the settings are, for example, the settings of path of the remote copying link 400. That is, they are settings defining the items such as which one of the storage apparatus A 200*a* and the storage apparatus B 200*b* is the sender of data and the destination of data, or which one of the communication ports 221*a* the data is transmitted from and which one of communication ports 221*b* the data is transmitted to. Furthermore, it is necessary to make correspondence between specifying of a logic volume created logically on the storage area provided by the storage volume A 210*a* and data of which logic volume is the subject of remote copying, and between specifying of a logic volume created logically on the storage area provided by the storage volume B 210*b* and which logic volume the data is to be written to. The contents of these settings will be described later.

As to Communication Protocol

Figure 2:
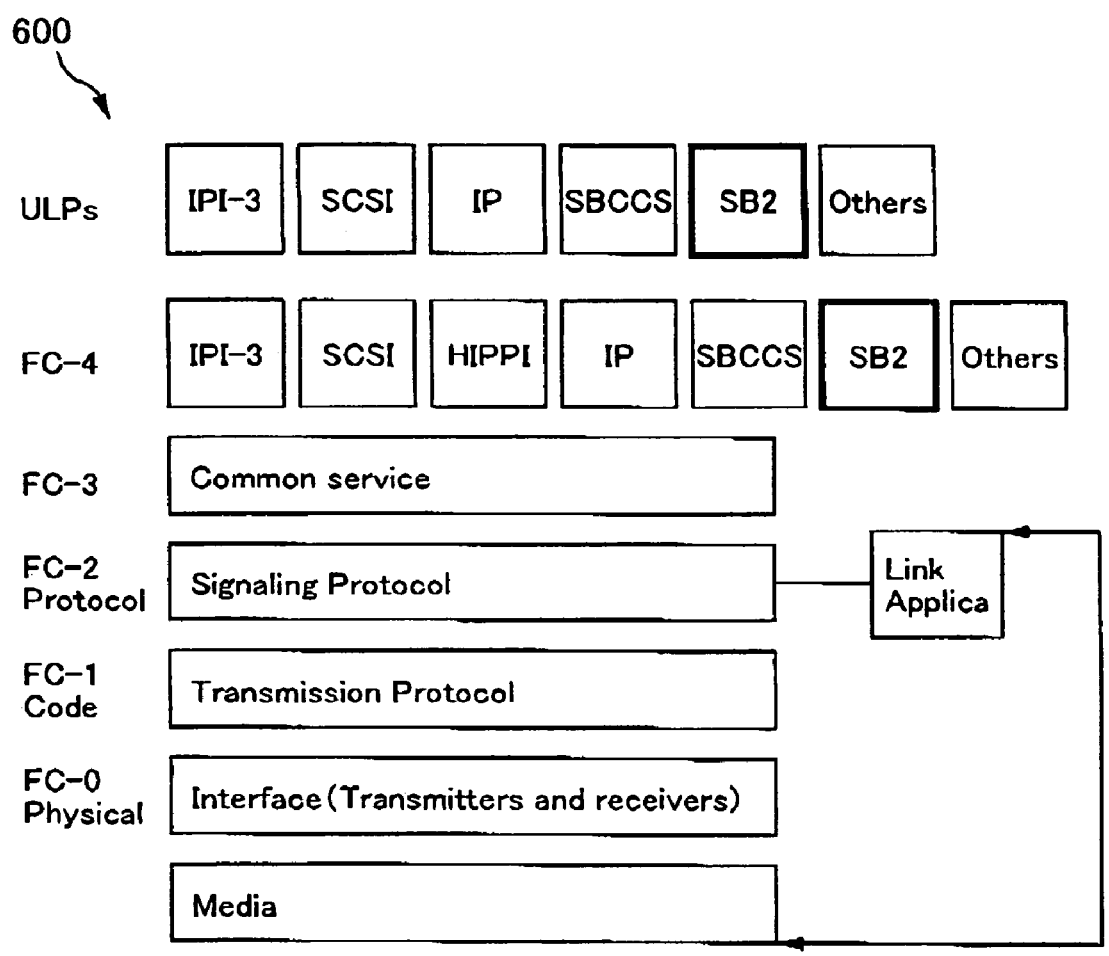
FIG. 2 is a diagram showing the layer configuration of a fiber channel protocol according to the embodiment.

Communication through the remote copying link 400 is carried out according to a predetermined communication protocol. Among the many fiber channel protocols defined by ANSI (American National Standard Institute), a protocol called FC-SB-2 can be used for remote copying. The details of it is described in "FIBER CHANNEL PHYSICAL AND SIGNALING INTERFACE (FC-PH) Rev. 4.3", of the ANSI standards but FC-SB-2 is formed by mapping a protocol used for main frames on FC-PH by which the physical layer of a fiber channel protocol is defined. FIG. 2 shows the layer configuration of this fiber channel protocol.

Among these, FC-SB-2 is a communication program characterized by the following items.

First, bi-directional communication can be available with it. Thereby, it is possible for communication ports on both ends on a physical link can simultaneously transmit data. In contrast, in FC-AL being a communication protocol for open systems, it is necessary for any one of communication ports to obtain at any time the right to transmit in order to be the initiator, and to carry out transferring of data to a target when the data is transferred. Therefore, during this operation, other communication ports can not be the initiator and can not carry out data transfer. Another characteristic is that multiple I/O (Input/Output) operations that are impossible in the conventional main frame protocols can be available conforming to most of the conventional main frame protocols. Thereby, multiple I/O process to a plurality of devices through one same physical link that is conventionally impossible can be available.

Figure 3:
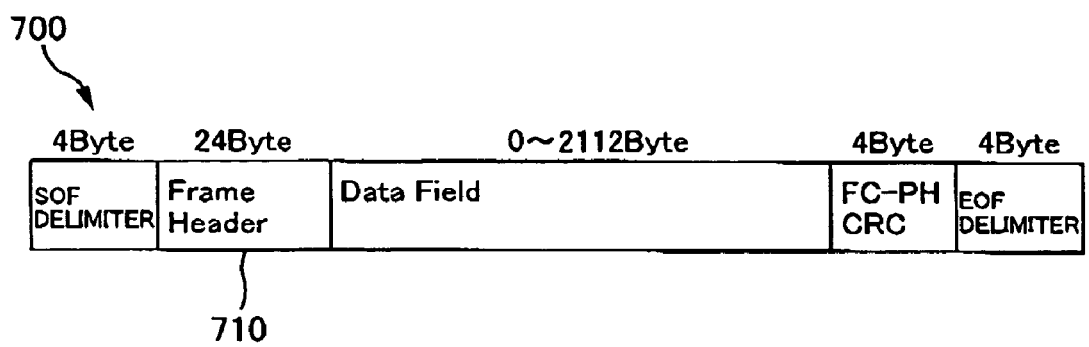
FIG. 3 is a diagram showing the configuration of a data frame of the fiber channel protocol according to the embodiment.

FIG. 3 shows the configuration of a data frame 700 of the fiber channel protocol according to the embodiment.

"SOF (Start Of Frame) delimiter" is a character indicating the start of a data frame. "EOF (End Of Frame) delimiter" is a character indicating the end of a data frame. "Data Field" is an area for storing data to be transmitted. "IFC-PH-CRC" is where a check code of a frame data is stored in. Information indicating the type of ULPs (Upper Level Protocols) among the protocol layers shown in FIG. 2 and information indicating the initiator having issued the data frame etc. are stored in "Frame Header 710".

Figure 4:
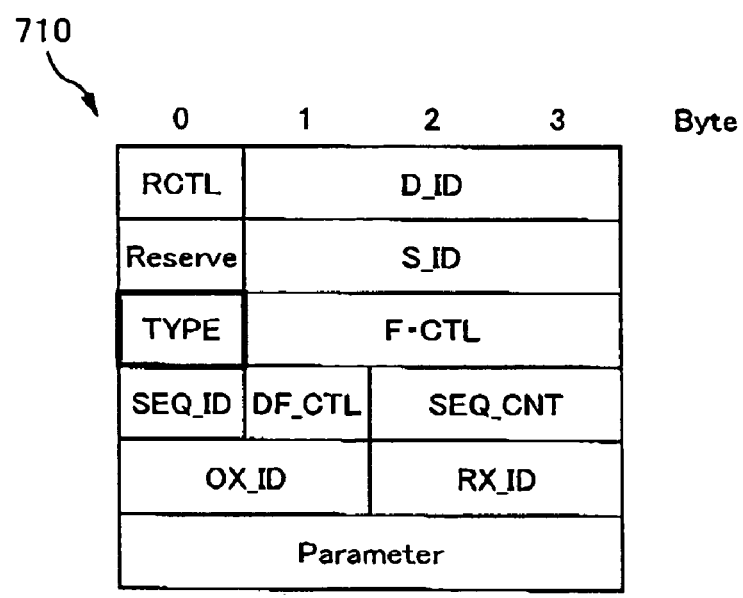
FIG. 4 is a diagram showing the configuration of a header portion of the data frame of the fiber channel protocol according to the embodiment.

FIG. 4 shows the configuration of a frame header 710.

"RCTL" indicates the protocol of the data frame and the type of the data frame. The address of a destination port is stored in "D-ID (Destination ID)". The address of a sender port is stored in "S-ID (Source ID)". A more specific code indicating the type of the frame defined by RCTL is stored in "TYPE". When the ULPs (Upper Level Protocols) are FC-SB-2, information indicating the initiator having issued the data frame is stored. Bits for managing and controlling I/O as a logical lump is stored in. "F-CTL". "SEQ-ID" indicates an ID given to a frame sequence. "SEQ-ONT" indicates an ID of a frame constituting one frame sequence. Information indicating whether the data frame is optical or not is stored in "DF-CTL". "OX-ID" and "RX-ID" indicate respectively the reference numbers given to the issuer and the receiver of I/O. Various pieces of information are stored in "Parameter" in response to the contents of RCTL.

By using such communication protocol, it is possible to carry out data transfers for remote copying.

As to Logic Paths

Figure 5:
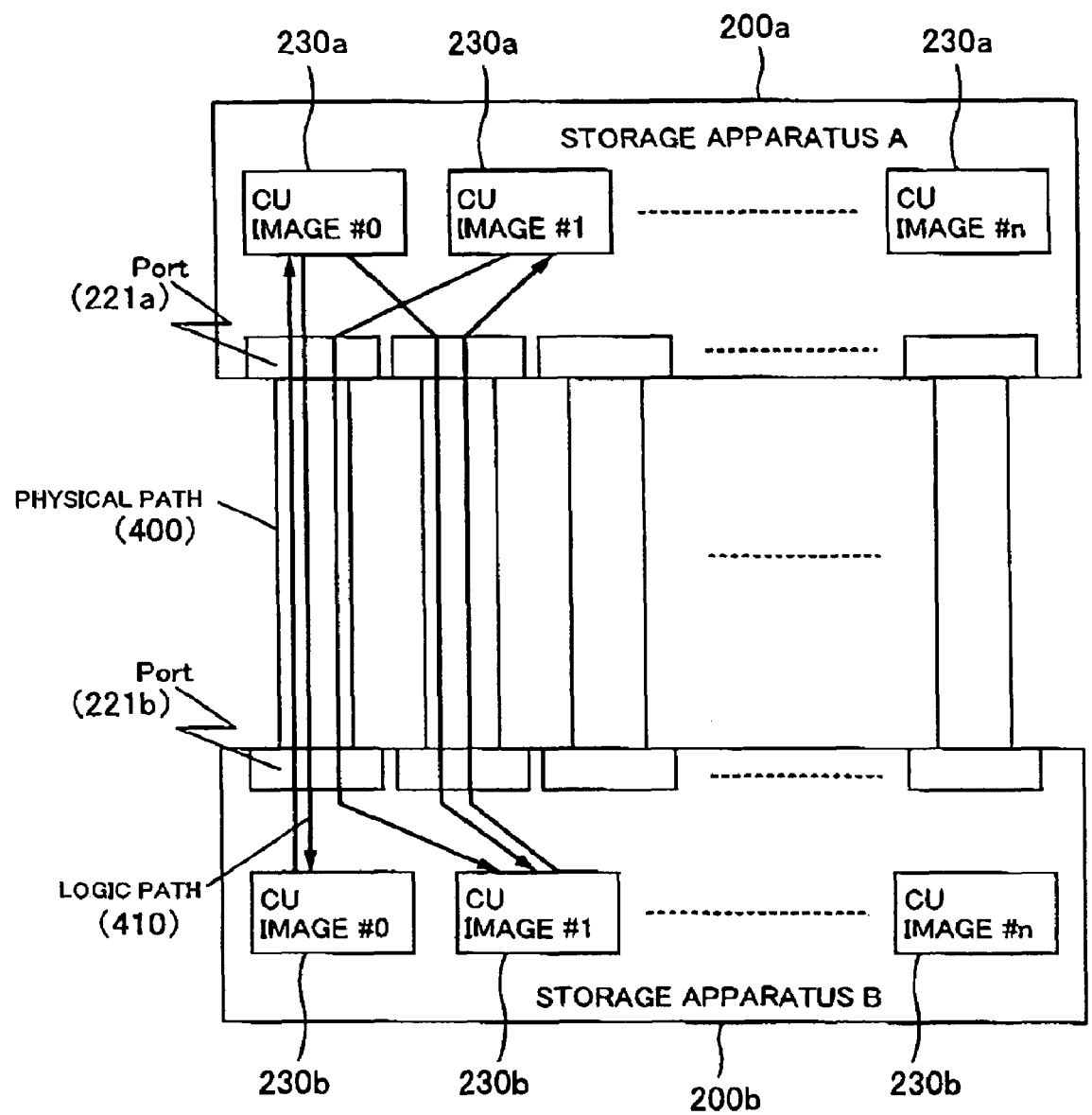
FIG. 5 is a block diagram illustrating data communication paths in the storage device controller system according to the embodiment.

Next, FIG. 5 shows a block diagram for illustrating a data communication in a storage device controller system according to the embodiment.

The storage apparatus A 200a and the storage apparatus B 200b are connected mutually through the physical path (a remote copying link) 400. The storage apparatus A 200a consists of n+1 CU (Control Unit) images 230a. ACU image 230a is a storage apparatus provided virtually on the storage apparatus A 200a. Thereby, it appears as if each of n+1 storage apparatuses is connected respectively to each of CU images 230a from the information processing apparatus A 100a shown in FIG. 1. The storage apparatus B 200b is also consists of n+1 Cu images 230b.

The connection between the storage apparatus A 200a and the storage apparatus B 200b through the remote copying link 400 is carried out by setting up a logical path (logic path) 410 for each of the CU images 230. The following logic paths are shown being set up in FIG. 5, That is, from the CU image #0 of the storage apparatus A 200a, logic paths toward the Cu image #0 and CU image #1 of the storage apparatus B 200b are set up. From the CU image #1 of the storage apparatus A 200a, a logic path toward the CU image #1 of the storage apparatus B 200b is set up. From the CU image #0 of the storage apparatus B 200b, a logic path toward the CU image #0 of the storage apparatus A 200a is set up. From the CU image #1 of the storage apparatus B 200b, a logic path toward the CU image #1 of the storage apparatus A 200a is set up.

The data transfer between the storage apparatus A 200a and the storage apparatus B 200b is carried out by setting up logic paths in advance as described above.

Setting up of Logic Paths

Figure 6:
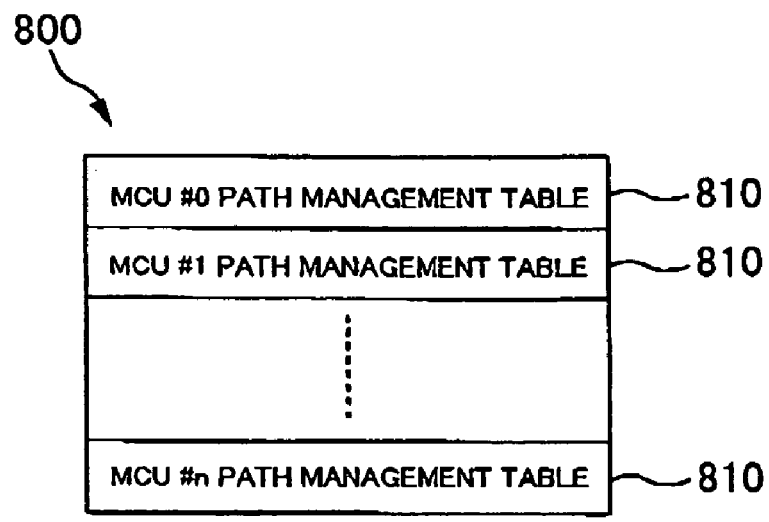
FIG. 6 is a diagram showing a path management table in the storage device controller system according to the embodiment.

Next, FIGS. 6–9 show tables for carrying out the setting up of the above logic paths (communication direction defining information). Creation of such tables is carried out by a program (application program) run on the storage apparatus A 200a. First, FIG. 6 shows a path management table 800 in the storage device controller system according to the embodiment.

The path management table 800 is an aggregation of MCU (Master CU) unit path management table 810 provided to each of the CU images 230. MCU herein means a CU of the storage apparatus on the main site.

Figure 7:
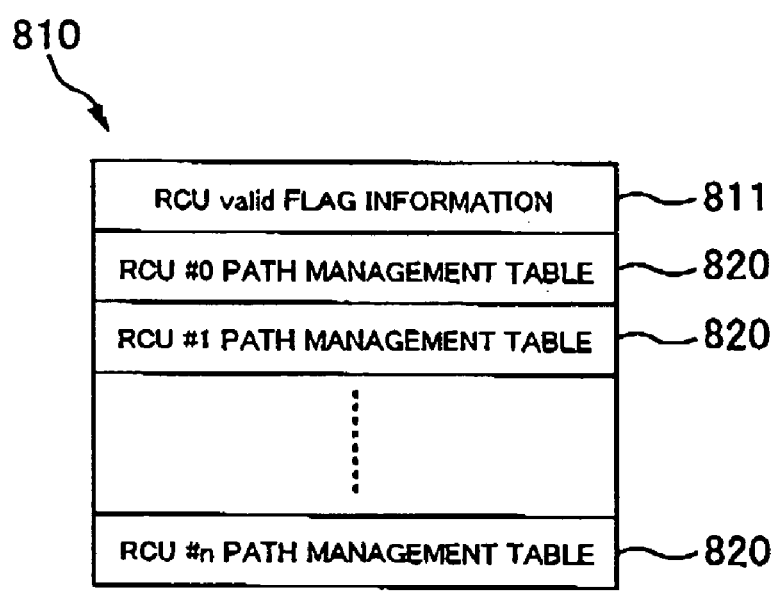
FIG. 7 is a diagram showing an MCU unit path management table in the storage device controller system according to the embodiment.

FIG. 7 shows a MCU unit path management table 810. The MCU unit path management table 810 is an aggregation of RCU valid flag information 811 and n+1 RCU (Remote CU) unit path management tables 820. RCU herein means a CU of the storage apparatus on the remote site.

The RCU valid flag information 811 is a bitmap for each RCU and, when it is "1", it indicates that the information is paired with the RCU and, when it is "0", it indicates that the information is not paired with the RCU.

Figure 8:
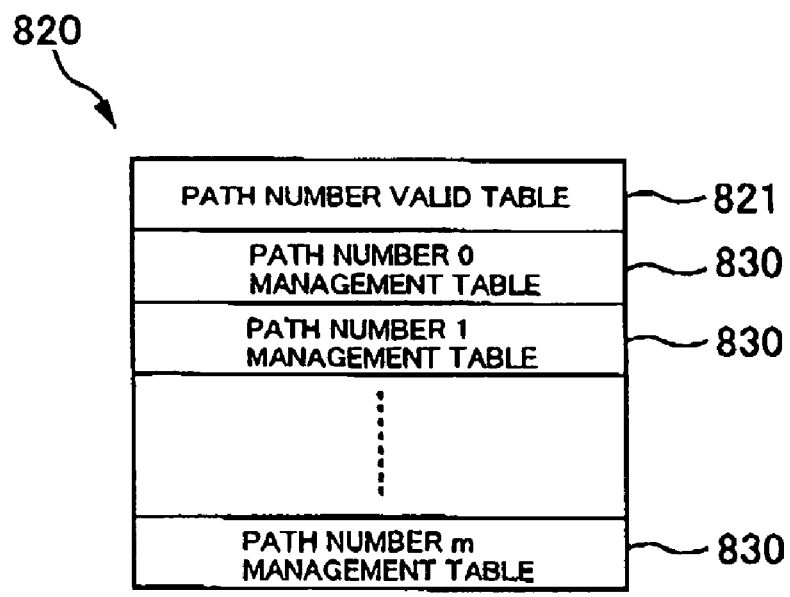
FIG. 8 is a diagram showing an RCU unit path management table in the storage device controller system according to the embodiment.

As shown in FIG. 8, the RCU unit path management table 820 is an aggregation of a path number valid table 821 and m+1 path unit management tables 830. The path number valid table 821 is a bitmap indicating whether each of m+1 logic paths capable of being formed between the RCU is respectively valid or invalid. When it is "1", it indicates that the logic path is valid and, when it is "0", it indicates that the logic path is invalid.

Figure 9:
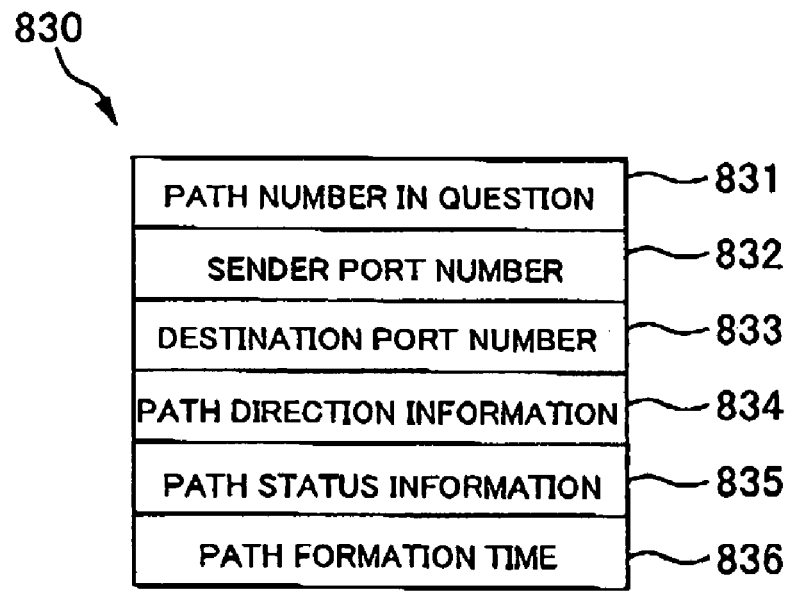
FIG. 9 is a diagram showing a path unit management table in the storage device controller system according to the embodiment.

As shown in FIG. 9, the path unit management table 830 is an aggregation of the path number 831, the sender port number 832, the destination port number 833, path direction information 834, path status information 835 and a path formation time 836.

The path direction information 834 is in a bitmap form. For example, in the case of information of four (4) bytes, when bit zero (0) is "1", it indicates that a path is formed with the MCU as the initiator and when bit zero (0) is "0", it indicates that the MCU is not the initiator. When bit one (1) is "1", it indicates that a path is formed with RCU as the initiator and the bit one (1) is "0", it indicates the RCU is not the initiator. When paths are formed in both of the directions, these bits are summed.

The path status information 835 indicates the status of the path. When the information is "0x01", it indicates the path is not formed, when it is "0x02", it indicates the path is being formed, when it is "0x03", it indicates the path has been formed, when it is "0x04", it indicates the path is being suspended and, when it is "0x05", it indicates the path is being re-formed. "0x" herein indicates that the digit coming after this is a hexadecimal digit. For example, if a failure occurs on the main site when the path has been formed and a status where the pair is formed can not be maintained temporarily, the status of the path is shifted to the status where the path is suspended. Then, if the path is formed from the main site after the main site has been recovered, the status of the path is shifted to the status where the path has been formed through the status where the path is being re-formed.

The path formation time 836 stores the system time when the path is formed.

In the storage device controller system according to the embodiment, using the above tables, the logic path 410 is formed on the remote copying link 400 being the data transfer path between the storage apparatus A 200a and the storage apparatus B 200b and the sender and the destination of data for carrying out remote copying are managed. Thereby, it is possible to carry out easily the setting up of a path in the opposite direction set up when the main site has been recovered.

That is, on the remote site, by re-constituting tables such that the RCU numbers and MCU numbers in the above tables are exchanged, it is possible to form a logic path in the opposite direction. Such re-configuration of the tables is carried out with a program (application program) run on the storage apparatus B 200*b*. Surely, when the re-configuration of the tables is carried out, the sender port number 832 and the destination port number 833 in the path unit management table are exchanged with each other.

In this way, in the storage device controller system according to the embodiment, it is possible to carry out easily the setting up of a path on the remote site by using the above tables.

Furthermore, in the storage device controller system according to the embodiment, the information indicating which storage apparatus is the initiator for forming a path in terms of the logic path 410 formed on the physically same remote copying link 400 can be managed. Thereby, it is possible to carry out bi-directional communication on the physically same remote copying link 400 from two (2) storage apparatuses. Therefore, it is possible to effectively utilize the physical path resource between the two (2) storage apparatuses.

Yet furthermore, the management of settings of the data transfer paths according to the embodiment can be applied not only to the settings for data transfer paths for remote copying but also to the settings of the data transfer paths in common information processing systems carrying out data transfer using communication protocols in which bi-directional communication is possible. Similarly, it can be applied to the settings of the data transfer path between the information processing apparatus A 100*a* and the storage apparatus A 200*a*.

As to Remote Copying

Figure 10:
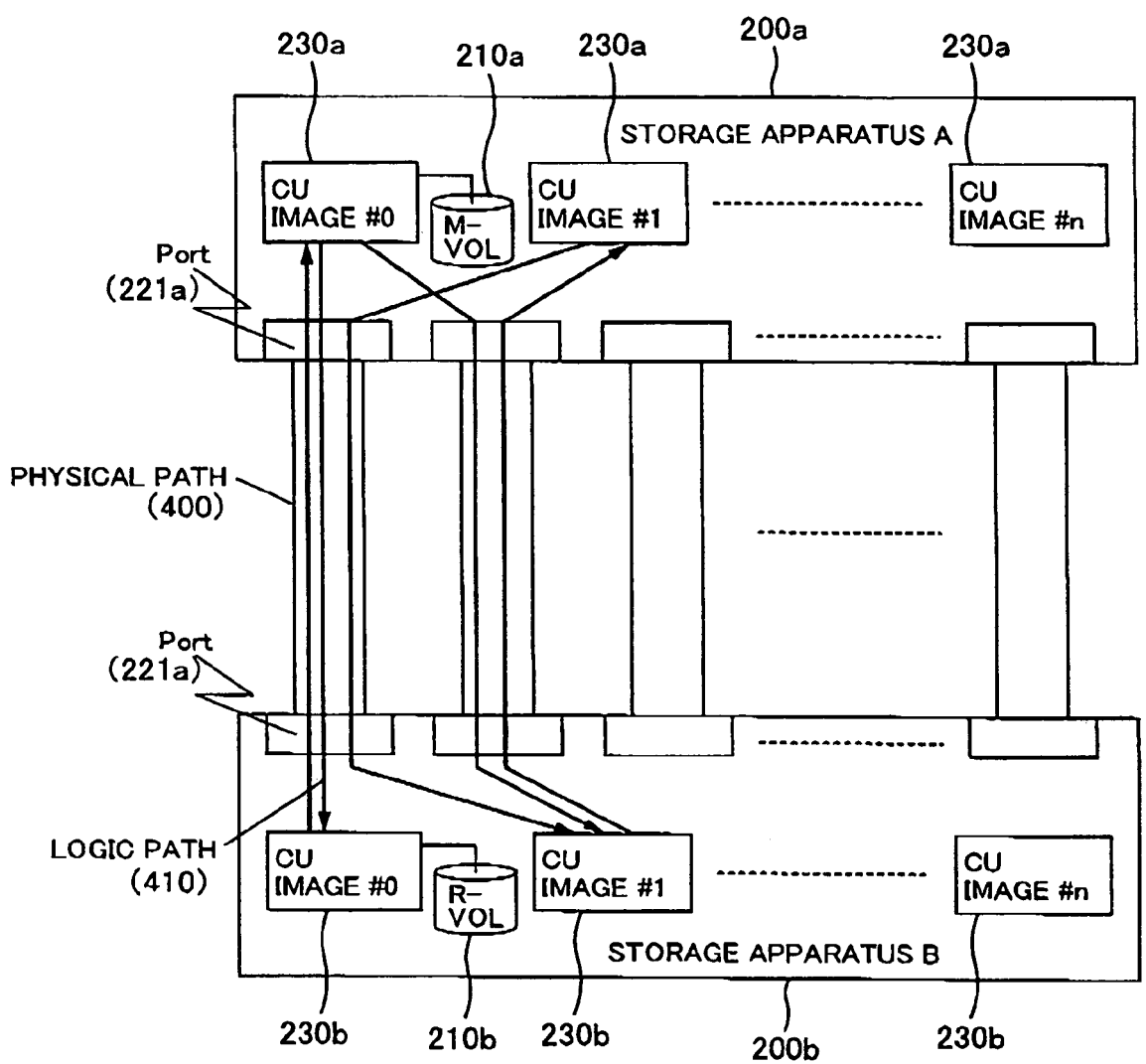
FIG. 10 is a block diagram illustrating remote copying in the storage device controller system according to the embodiment.

Next, a block diagram for illustrating remote copying carried out in the storage device controller system according to the embodiment is shown in FIG. 10.

The storage apparatus A 200*a* and the storage apparatus B 200*b* are connected mutually by the physical path (remote copying link) 400. The storage apparatus A 200*a* consists of n+1 Cu images 230*a*. Similarly, the storage apparatus B 200*b* consists of n+1 CU images 230*b*.

The connection between the storage apparatus A 200*a* and the storage apparatus B 200*b* through the remote copying link 400 is carried out by setting up the logical path (logic path) 410 for each of the CU images 230. The settings for the logic path 410 is same as in FIG. 5, In FIG. 10, the CU image #0 of the storage apparatus A 200*a* manages M-VOL 210*a*. The CU image #0 of the storage apparatus B 200*b* manages R-VOL 210*b*. The settings for remote copying have been carried out such that, when new data is written to the M-VOL 210*a*, the duplicate of the data is written to the R-VOL 210*b*.

Settings for Remote Copying

Figure 11:
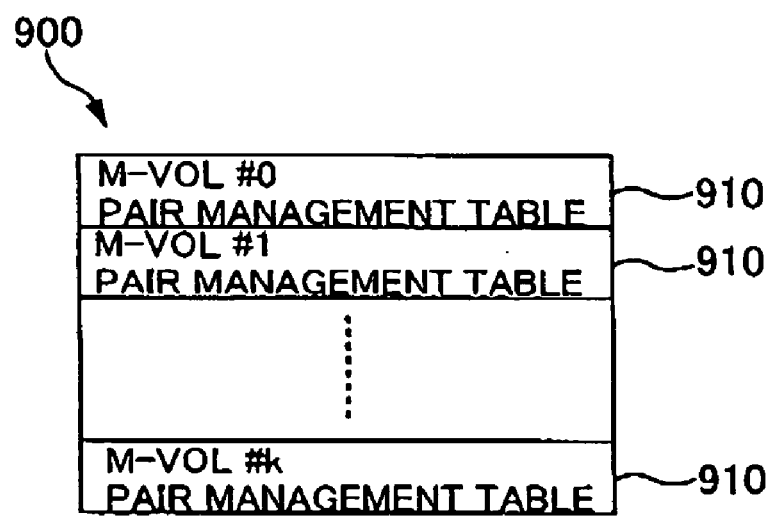
FIG. 11 is a diagram showing a pair volume management table in the storage device controller system according to the embodiment.
Figure 12:
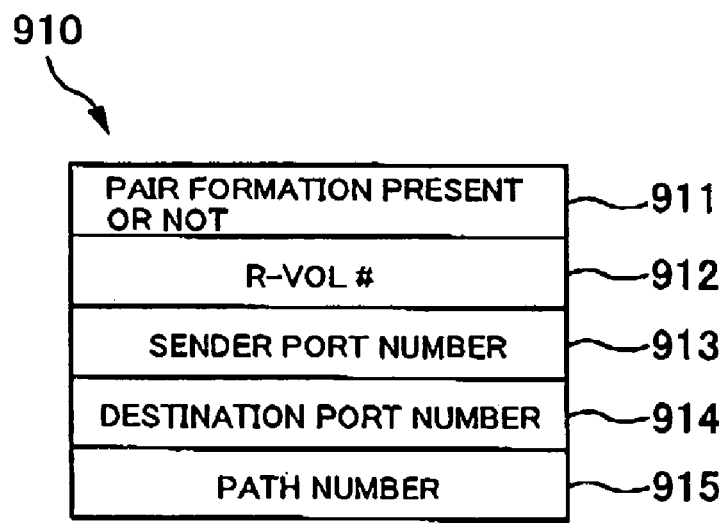
FIG. 12 is a diagram showing an M-VOL unit management table in the storage device controller system according to the embodiment.

Tables for making settings for such remote copying are shown in FIG. 11 and FIG. 12.

A pair volume management table 900 shown in FIG. 11 is an aggregation of k+1 M-VOL unit management tables 910 shown in FIG. 12. The M-VOL unit management table 910 is created for each of M-VOL 210*a* created in the storage apparatus A 200*a* and stores information indicating whether pair forming is present or not 911, and showing the R-VOL number 912, the sender port number 913, the destination port number 914 and a path number 915. The creation of the pair volume management table 900 is carried out with a program (application program) run on the storage apparatus A 200*a*.

The information indicating whether the pair forming is present or not 911 indicates whether the M-VOL 210*a* is targeted for remote copying or not. When it is "1", the M-VOL 210*a* is targeted for remote copying and, when it is "0", the M-VOL 210*a* is not targeted for remote copying. When the M-VOL 210*a* is targeted for remote copying, a duplicate of the data written in the M-VOL is transmitted to the remote site. R-VOL number 912 indicates the number of a storage volume for storing data for remote copying transmitted to the remote site. The sender port number 913 indicates the communication port 221*a* number on the main site. The destination port number 914 indicates the communication port 221*b* number on the remote site. The path number 915 indicates the logic path number for transmitting the data for remote copying.

In the storage device controller system according to the embodiment, using the above tables, the sender storage volume (M-VOL) and destination storage volume (R-VOL) can be managed when remote copying is carried out. Thereby, it is possible to easily make settings for remote copying in the opposite direction set up when the main site has been recovered from a disaster.

That is, it is possible to make settings for remote copying in the opposite direction by re-constituting the tables such that the R-VOL number and M-VOL number are exchanged with each other in the above tables on the remote site. Such re-configuration of the tables can be carried out with a program (application program) run on the storage apparatus B 200*b*. Surely, when the re-configuration of the tables is carried out, the sender port number 913 and the destination port number 914 in the M-VOL unit management table 910 are exchanged with each other.

In this way, in the storage device controller system according to the embodiment, it is possible to make settings easily for the path on the remote site.

The embodiment has been described, however, the above embodiment is intended only to facilitate understanding the invention and not intended to limit the interpretation of the invention. Various changes and modifications of the invention can be made without departing from the scope and spirit of the invention and the invention includes its equivalents.

The invention can thus provide an information system, a storage system, a storage device controller and a program.

While illustrative and presently preferred embodiments of the present invention have been described in detail herein, it is to be understood that these embodiments could variously be modified, permuted or altered without departing from the spirit and scope of the invention defined by the appended claims.

What is claimed is:

1. An information processing system including:
    a first information processing apparatus having a first communication port for transmitting and receiving data;
    a second information processing apparatus having a second communication port for transmitting and receiving data; and
    a communicating portion for executing bi-directional communication between the first communication port and the second communication port, the information processing system comprising:
    a utilizing portion for utilizing the communicating portion, for communication in a direction for which a first application program run on the first information processing apparatus sets the first communication port and the second communication port respectively as the sender and the destination of data;

another utilizing portion for utilizing the communicating portion, for communication in a direction for which a second application program run on the second information processing apparatus sets the second communication port and the first communication port respectively as the sender and the destination of data; and a path unit management table, each of the first and second application programs being operable to form and re-form a path for communication between the first and second information processing apparatus, thereby controlling a direction of communications in the path, by setting path information in the path unit management table.

2. A storage system including:

a first storage device controller connected to a first storage device;

a second storage device controller connected to a second storage device;

a first communication port that the first storage device controller has for transmission and reception of data;

a second communication port that the second storage device controller has for transmission and reception of data;

a communicating portion for carrying out bi-directional communication between the first communication port and the second communication port, and being configured to write the data to be written to the first storage device also to the second storage device;

a utilizing portion for utilizing the communicating portion, for communication in a direction for which a first application program run on the first information processing apparatus sets the first communication port and the second communication port respectively as the sender and the destination of data;

another utilizing portion for utilizing the communicating portion, for communication in a direction for which a second application program run on the second information processing apparatus sets the second communication port and the first communication port respectively as the sender and the destination of data; and a path unit management table, each of the first and second application programs being operable to form and re-form a path for communication between the first and second communication ports, thereby controlling a direction of communications in the path, by setting path information in the path unit management table.

3. A storage system according to claim 2, wherein the utilizing portion for utilizing the communicating portion, for communication in a direction for which a first application program run on the first storage device controller sets the first communication port and the second communication port respectively as the sender and the destination of data includes a storing portion for storing in the first storage device controller communication direction defining information in which the first application program run on the first storage device controller sets the first communication port and the second communication port respectively as the sender and the destination of data, and for utilizing the communicating portion for communication in the direction defined in the information; and wherein the utilizing portion for utilizing the communicating portion, for communication in a direction for which a second application program run on the second storage device controller sets the second communication port and the first communication port respectively as the sender and the destination of data includes a utilizing portion for utilizing the communicating portion for communication in a direction for which the second application program run the second storage device controller exchanges the communication ports allocated respectively as the sender and the destination of the communication direction defining information.

4. A storage system according to claim 2 further comprising:

a relating portion for relating a first storage area set logically in a storage area provided by the first storage device and a second storage area set logically in a storage area provided by the second storage device respectively to the duplication source and the duplication destination of data, and for writing the data to be written to the first storage area, also to the second storage area; and a relating portion for relating the second storage area and the first storage area respectively to the duplication source and the duplication destination, and for writing the data to be written to the second storage area, also to the first storage area.

5. A first information processing apparatus in an information processing system including:

the first information processing apparatus having a first communication port for transmitting and receiving data;

second communication port for transmitting and receiving data;

a communicating portion for executing bi-directional communication between the first communication port and the second communication port, the first information processing apparatus comprising a utilizing portion for utilizing the communicating portion, for communication in a direction for which an application program run on the first information processing apparatus sets the first communication port and the second communication port respectively as the sender and the destination of data; and a path unit management table allowing the application program to form and re-form a path for communication between the first and second information processing apparatus, thereby controlling a direction of communications in the path, by setting path information in the path unit management table.

6. A second information processing apparatus in an information processing system including:

a first information processing apparatus having a first communication port for transmitting and receiving data;

the second information processing apparatus having a second communication port for transmitting and receiving data;

a communicating portion for executing bi-directional communication between the first communication port and the second communication port, the second information processing apparatus comprising a utilizing portion for utilizing the communicating portion, for communication in a direction for which an application program run on the second information processing apparatus sets the second communication port and the first communication port respectively as the sender and the destination of data; and a path unit management table allowing the application program to form and re-form a path for communication between the first and second information processing apparatus, thereby controlling a direction of communications in the path, by setting path information in the path unit management table.

7. A first storage device controller in a storage system including:
the first storage device controller connected to a first storage device;
a second storage device controller connected to a second storage device;
a first communication port that the first storage device controller has for transmission and reception of data;
a second communication port that the second storage device controller has for transmission and reception of data;
a communicating portion for carrying out bi-directional communication between the first communication port and the second communication port, and being configured to write the data to be written to the first storage device also to the second storage device, the first storage device controller comprising a utilizing portion for utilizing the communicating portion, for communication in a direction for which an application program run on the first storage device controller sets the first communication port and the second communication port respectively as the sender and the destination of data; and
a path unit management table allowing the application program to form and re-form a path for communication between the first and second communication ports, thereby controlling a direction of communications in the path, by setting path information in the path unit management table.

8. A storage device controller according to claim 7, wherein the utilizing portion for utilizing the communicating portion, for communication in a direction for which an application program run on the first storage device controller sets the first communication port and the second communication port respectively as the sender and the destination of data includes:
a storing portion for storing in the first storage device controller communication direction defining information in which the application program run on the first storage device controller relates the first communication port and the second communication port respectively to the sender and the destination of data, and for utilizing the communicating portion for communication in the direction defined in the information.

9. A storage device controller according to claim 7 further comprising:
a relating portion for relating a first storage area set logically in a storage area provided by the first storage device and a second storage area set logically in a storage area provided by the second storage device respectively to the duplication source and the duplication destination of data, and for writing the data to be written to the first storage area also to second storage area.

10. A second storage device controller in a storage system including:
a first storage device controller connected to a first storage device;
the second storage device controller connected to a second storage device;
a first communication port that the first storage device controller has for transmission and reception of data;
a second communication port that the second storage device controller has for transmission and reception of data;
a communicating portion for carrying out bi-directional communication between the first communication port and the second communication port, and being configured to write the data to be written to the first storage device also to the second storage device, the second storage device controller comprising a utilizing portion for utilizing the communicating portion, for communication in a direction for which an application program run on the second storage device controller sets the first communication port and the second communication port respectively as the sender and the destination of data; and
a path unit management table allowing the application program to form and re-form a path for communication between the first and second communication ports, thereby controlling a direction of communications in the path, by setting path information in the path unit management table.

11. A storage device controller according to claim 10, wherein the utilizing portion for utilizing the communicating portion, for communication in a direction for which an application program run on the second storage device controller sets the second communication port and the first communication port respectively as the sender and the destination of data includes:
a storing portion for storing in the second storage device controller communication direction defining information in which the application program run on the second storage device controller relates the second communication port and the first communication port respectively to the sender and the destination of data, and for utilizing the communicating portion, for communication in the direction defined in the information.

12. A storage device controller according to claim 10 further comprising:
a relating portion for relating a first storage area set logically in a storage area provided by the first storage device and a second storage area set logically in a storage area provided by the second storage device respectively to the duplication source and the duplication destination of data, and for writing the data to be written to the second storage area also to the first storage area.

13. A computer-readable medium containing a computer program software for causing an information processing system including:
a first information processing apparatus having a first communication port for transmitting and receiving data;
a second information processing apparatus having a second communication port for transmitting and receiving data;
a path unit management table allowing an application program to form and re-form a path for communication between the first and second information processing apparatus, thereby controlling a direction of communications in the path, by setting path information in the path unit management table; and
a communicating portion for executing bi-directional communication between the first communication port and the second communication port, to execute the steps of:
utilizing the communicating portion, for communication in a direction for which the first communication port and the second communication port are respectively set as the sender and the destination of data; and utilizing the communicating portion, for communication in a direction for which the second communication port and the first communication port are respectively set as the sender and the destination of data.

14. A computer-readable medium containing a computer program software for causing a storage system including:
- a first storage device controller connected to a first storage device;
- a second storage device controller connected to a second storage device;
- a first communication port that the first storage device controller has for transmission and reception of data;
- a second communication port that the second storage device controller has for transmission and reception of data;
- a path unit management table allowing an application program to form and re-form a path for communication between the first and second communication ports, thereby controlling a direction of communications in the path, by setting path information in the path unit management table; and
- a communicating portion for carrying out bi-directional communication between the first communication port and the second communication port, and having:
  - a function for writing the data to be written to the first storage device also to the second storage device, to execute the steps of:
  - utilizing the communicating portion, for communication in a direction for which the first communication port and the second communication port are respectively set as the sender and the destination of data; and
  - utilizing the communicating portion, for communication in a direction for which the second communication port and the first communication port are respectively set as the sender and the destination of data.

15. A computer-readable medium containing the computer program software according to claim 14, wherein the step of utilizing the communicating portion, for communication in a direction for which the first communication port and the second communication port are respectively set as the sender and the destination of data includes a step of storing in the first storage device controller communication direction defining information in which the first communication port and the second communication port are respectively related to the sender and the destination of data, and utilizing the communicating portion for communication in the direction defined in the information and wherein
the step of utilizing the communicating portions, for communication in a direction for which the second communication port and the first communication port are respectively set as the sender and the destination of data includes a step of utilizing the communicating portion, for communication in a direction for which the communication ports allocated respectively as the sender and the destination of the communication direction defining information are exchanged with each other.

16. A computer-readable medium containing a computer program software according to claim 14 comprising the steps of:
- utilizing the communicating portion, for communication in a direction for which the first communication port and the second communication port are respectively set as the sender and the destination of data;
- relating a first storage area set logically in a storage area provided by the first storage device and a second storage area set logically in a storage area provided by the second storage device respectively to the duplication source and the duplication destination of data, and writing the data to be written to the first storage area, also to the second storage area;
- utilizing the communicating portion, for communication in a direction for which the second communication port and the first communication port are respectively set as the sender and the destination of data; and
- relating the second storage area and the first storage area respectively to the duplication source and the duplication destination of data, and writing the data to be written to the second storage area, also to the first storage area.

* * * * *